INVENTOR.
GEORGE H MYERS
FRANKLIN C HARTER
BY
ATTORNEYS

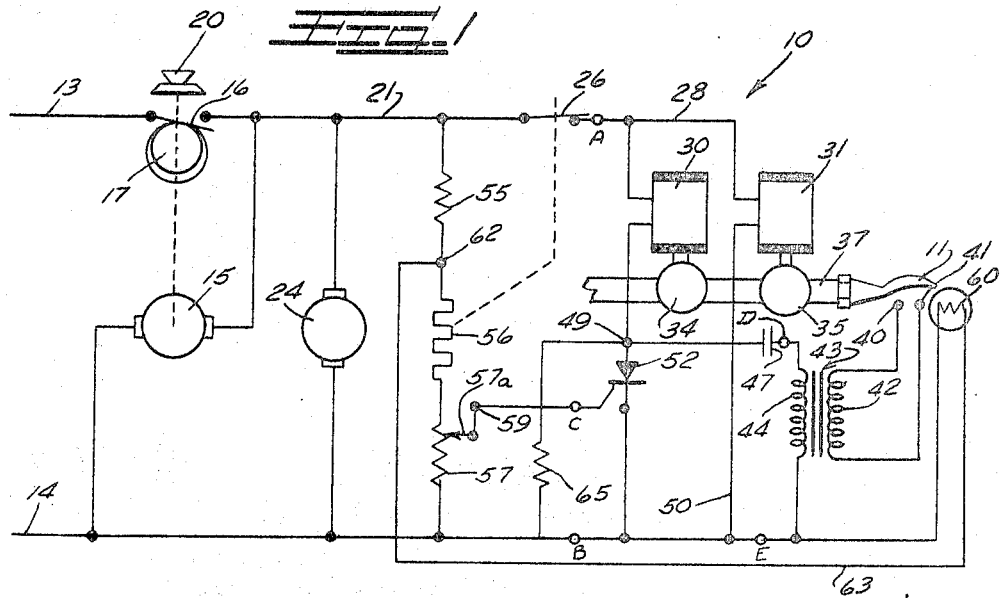

United States Patent Office 3,488,131
Patented Jan. 6, 1970

3,488,131
ELECTRONIC SPARK IGNITOR CONTROL FOR FUEL BURNER
George H. Myers, St. Joseph, and Franklin C. Harter, Stevensville, Mich., assignors to Whirlpool Corporation, Benton Harbor, Mich., a corporation of Delaware
Filed Oct. 26, 1964, Ser. No. 406,400
Int. Cl. F23n 5/00; F23q 3/00
U.S. Cl. 431—24                        13 Claims This invention relates generally to an improvement on a control system for igniting and controlling fuel gas used in a domestic clothes dryer and more specifically to a control system which operates both an electrically operated gas valve and an ignitor system from a single electronic switching device.

In control systems of the prior art, electro-mechanical switching devices have been provided such as a thermal bi-metal switching or relay switching to ignite and control fuel gas supplied to a burner. Although these past control systems provide a fundamentally workable means to control a fuel burner in a clothes dryer, there still exists a need for a control system with improved reliability, reduced size having a minimum number of components and a system which is not expensive to manufacture or maintain.

Also in past control systems, the fuel gas is ignited in some instances by a glow-type ignitor, which is energized by the electro-mechanical switching device. The glow-type ignitors comprise a resistant heating element which generates heat sufficient to ignite fuel when electric current passes therethrough. This type of ignitor is also subject to failure because of excessive current flow which can permanently burn the heating element in two. In other instances fuel burners are ignited by a maintained pilot light flame in proximity with the main fuel burner. Although this system is not as prone to failure due to burnout of the ignitor, as is the case of the glow-type ignitor, it requires continuous supply of fuel gas even when the main gas burner is not in operation, thereby reducing the efficiency of the fuel burner.

Still another disadvantage found in control systems of the prior art is the use of one or more switching devices to control each respective function of the control system. By so using an increased number of components for proper operation, the manufacturing cost is increased, while the control system reliability is decreased because of the risk of one of the switching devices becoming inoperative.

It is therefore an important object of this invention to incorporate in a fuel burner an improved control system having a minimum number of electronic switching devices.

It is further contemplated by this invention, that the arrangement of components in the ignitor and control system greatly decreases the number of components necessary to produce reliable control of the flow of fuel gas and also to eliminate any hazardous conditions which may occur during normal operation of a clothes dryer.

To that end, a flame responsive element, such as a thermal responsive variable resistor is placed in proximity to the flame from the fuel burner for sensing the presence of a flame emanating therefrom. This flame responsive element is then connected in a triggering circuit which controls an electronic switching device which, in turn, controls both the initial energization of an electrically operated fuel valve and of an electronic spark ignitor.

Another object of the present invention is to provide an electronic ignitor and control system which can readily detect and deenergize the system in case of the failure of the ignitor to ignite a quantity of fuel gas in a predetermined period of time.

Another object of the present invention is to provide an improved electronic ignitor and control system which can be used to control a gas burner adapted to be connected to a domestic clothes dryer.

Still another object of the present invention is to provide an ignitor and control system which has improved reliability, reduced size and having a minimum number of components and which is not expensive to manufacture or maintain.

Yet another object of the present invention is to provide a control system which energizes an electronic ignitor system and an electrically operated fuel valve simultaneously at the beginning of a drying cycle and thereafter completely deenergizes the ignitor system and only reduces the operating voltage supplied to the electrically operated valve to a value sufficient to maintain the electrically operated valve energized.

Yet another object of the present invention is to provide an ignitor and control system having an electronic switching device which energizes an electrically operated valve and an ignitor system simultaneously at a predetermined instantaneous voltage level from a sine wave source of alternating current.

A further important object of the present invention is to provide an electronic ignitor and control circuit which will not operate a fuel burner unless the safety sensing devices in the circuit are operable.

Although the preferred embodiment of the present invention has particular utility when used in household clothes dryers of the type where clothes are tumbled in a rotatable drum wherein heated air is applied, it is not to be construed as a limiting environment.

Many other and more specific objects, features and advantages will become more fully apparent to those skilled in the art from the following detailed description taken in conjunction with the accompanying drawings which illustrates the preferred embodiment wherein:

On the drawings:

FIGURE 1 is a schematic wiring diagram illustrating the types of solid state devices used in the manner in which they are connected in the control system;

FIGURE 2 is a schematic wiring diagram showing an alternate embodiment of the control system in FIGURE 1;

As shown on the drawings:

Figure 3:
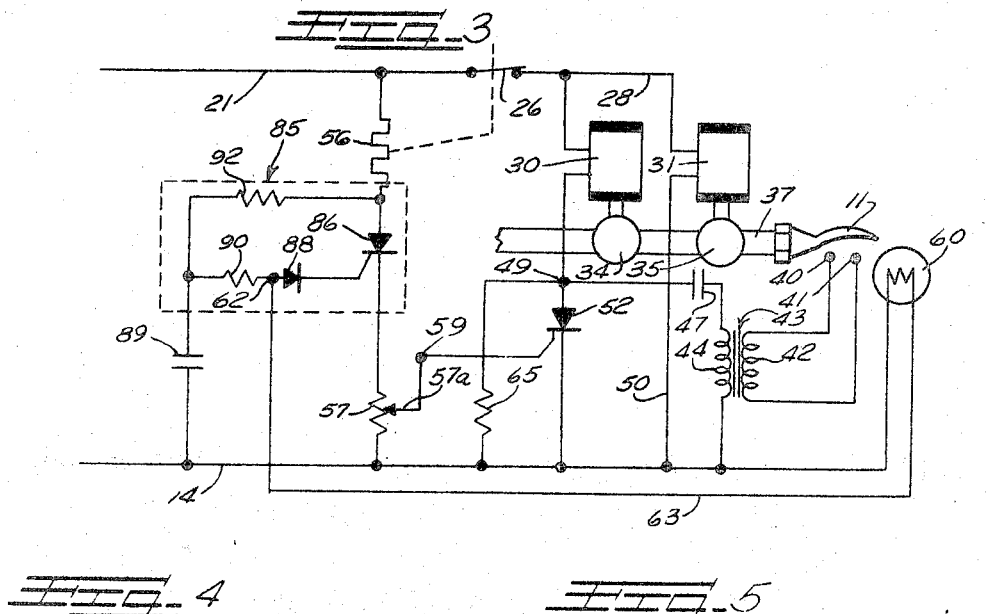
FIGURE 3 is a schematic wiring diagram showing still another alternate embodiment of the control system shown in FIGURE 1.

Reference numeral 10 designates generally the ignitor and control system which is used to control a fuel burner 11 during the normal drying cycle of a clothes dryer. A pair of input leads 13 and 14 for applying power of alternating voltage to the ignitor and control system 10 is connected to a suitable timing means comprising a timing motor 15, a switch 16, a cam 17 and an actuating knob 20. Power is supplied to the control system 10 through the switch 16 during a predetermined drying cycle of the clothes dryer. Connected between the line 14 and a line 21 is a drive motor 24 which is adapted to be connected to a rotatable drum, not shown, for rotation thereof.

A thermal responsive bi-metal switch 26 is disposed between the line 21 and a line 28 for applying power to one side of a pair of solenoid valves 30 and 31 which have body portions 34 and 35 respectively and which are disposed in series in a fuel feeding conduit 37 the end of which is connected to the fuel burner 11. The series arrangement of the solenoid valves 30 and 31 provides a safety feature which prevents the flow of fuel to the fuel burner 11 should one or the other of the valves become leaky or stick in the open position. Although the electrically operated valves illustrated and described herein are of the solenoid type, other types of electrically operated valves such as heat motor type could be employed.

Located in proximity with the fuel burner 11 are a pair of discharge electrodes 40 and 41 which are connected to a secondary winding 42 of a transformer 43. Connected to a primary winding 44, of the transformer 43, is one end of a discharge capacitor 47 which has the other end thereof connected to a terminal point 49. The capacitor 47 is charged by each half cycle of alternating voltage through line 13, switch 16, line 21, switch 26, line 28, solenoid valve 30, terminal point 49, primary winding 44 and line 14 during the entire drying operation.

When power is initially applied to the control system 10 the solenoid 31 is energized by current flow therethrough from the line 28 through a line 50. Also, the capacitor 47 will charge as mentioned hereinabove. To rapidly discharge the capacitor 47 through the primary winding, thereby producing an arc between the discharge electrodes 40 and 41, and to energize the solenoid valve 30, a silicon controlled rectifier 52 is connected between the line 14 and terminal point 49. Providing the necessary triggering or gating voltage for the silicon controlled rectifier 52 is a voltage divider network comprising a resistor 55, an electric heating device 56 and an adjustable resistor 57. The gate electrode of the silicon controlled rectifier 52 is connected to the movable arm 57a connecting the adjustable resistor 57. The adjustable resistor 57 provides means for adjusting the triggering point of the silicon controlled rectifier 52 to obtain optimum performance of the ignitor and solenoid valve 30. The thermal responsive bi-metal switch 26 is arranged to receive heat from the heater 56 thereby opening the contacts of the switch 26 after a predetermined period of time in the event the fuel from the fuel burner fails to ignite. Although the switch 26 is shown herein as a bi-metal switch or what is termed in the art as a "warp switch," it is obvious that any suitable timing means can be disposed between the lines 21 and 28 to remove the power from the solenoid valves 30 and 31 in the event the fuel from the fuel burner fails to ignite.

Located in proximity with the fuel burner 11 is a thermal responsive variable resistor 60 having one lead thereof connected to the line 14 and the other lead thereof connected to a terminal point 62 through a line 63. By way of example, the thermal responsive variable resistor 60 is a thermistor having a negative resistance temperature coefficient. Other flame responsive devices, such as a bimetallic thermostat or a light sensitive cell, could well be employed in place of variable resistor 60. A holding or bypass resistor 65 is connected between the terminal point 49 and the line 14, thereby shunting the silicon controlled rectifier 52 during the normal drying cycle of the control system 10.

In operation, the control knob 20 is actuated to close the switch 16, thereby applying a source of alternating voltage between the lines 14 and 21. This action will energize the timing motor 15 and the drive motor 24 until the cam 17 has sufficiently rotated to again open the switch 16, thereby indicating the end of a normal drying cycle. However, during the initiating of the drying cycle, power is applied to the solenoid valves 30 and 31 through the thermal bi-metal switch 26. The solenoid valve 31 is energized through the line 50, while the solenoid valve 30 will be energized through the silicon controlled rectifier 52 upon conduction thereof. The voltage divider network comprising the resistor 55, the heating element 56, and the adjustable resistor 57 is selected to provide the necessary gate current to flow in the silicon controlled rectifier when the instantaneous voltage level across the silicon controlled rectifier is at a predetermined value. By way of example, and not by way of limitation, the voltage divider network may provide the necessary gate firing current when the potential at the terminal point 49 has reached 100 volts. This will allow the capacitor 47 to charge during the first portion of a positive half cycle until the silicon controlled rectifier 52 is rendered conductive to energize both the solenoid valve 30 and the primary winding 44.

Figure 4:
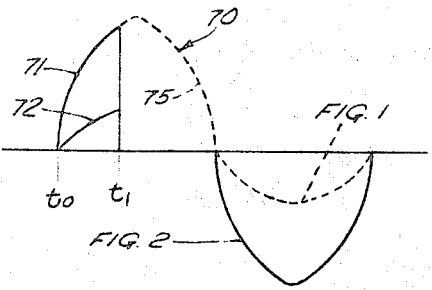
FIGURE 4 is a graphical representation of a voltage waveform which appears across the silicon control rectifier shown in FIGURES 1 and 2.
Figure 5:
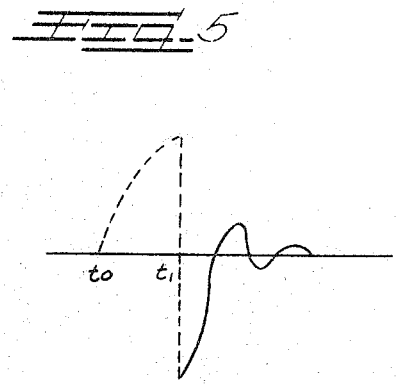
FIGURE 5 is a graphical representation of a voltage waveform which appears across the primary winding of a high voltage ignitor transformer shown in FIGURES 1, 2 and 3.

As shown in FIGURE 4, the graphical representation of a voltage waveform developed across the silicon controlled rectifier 52 is shown to indicate the portion of the sine wave that will conduct through the solenoid valve 30 during each cycle of alternating current. The voltage sine wave 70 is developed across the silicon controlled rectifier 52. The positive going portion 71 of the waveform 70 will be developed across the silicon controlled rectifier 52 and also the charge capacitor 47 through the primary winding 44 of the transformer 43. As the voltage continues to increase along the line 71 the voltage drop at the line point 59 also increases in a proportional manner which may be indicated at line 72. As the voltage at the line point 59 increases it reaches a sufficient value to cause sufficient gate current to flow through the silicon controlled rectifier 52, to render the silicon controlled rectifier 52 conductive. This action will create a very low resistance between the terminal point 49 and the line 14 during the remainder of the positive half cycle as indicated at 75 on the voltage waveform 70.

It can be seen therefore that by short circuiting the terminal point 49 to the line 14 when the capacitor 47 reaches a predetermined voltage, the capacitor will rapidly discharge through the primary winding 44 of the transformer 43 creating a rapidly expanding magnetic field therein which will induce a high voltage potential in the secondary winding 42. This high voltage will produce the necessary arc between the discharge electrodes 40 and 41 for ignition of the fuel from the fuel burner 11. Also, during the remainder of the positive half cycle, as indicated at 75 of the waveform 70, energizing current will pass through the solenoid valve 30 allowing fuel to flow through the solenoid valve 34, the solenoid valve 35 and fuel pipe 37 to the fuel burner 11. In this manner during each cycle of alternating voltage applied to the control system 10 only the positive half cycle will produce an arc between discharge electrodes 40 and 41.

When the fuel from the fuel burner 11 is ignited, the flame therefrom will heat the thermistor 60, thereby decreasing its resistance value as the temperature increases. This action will cause the voltage drop applied between the terminal point 62 and the line 14 to decrease substantially which will also decrease the voltage drop between the terminal point 59 and the line 14. This decreased voltage drop at line point 59 will decrease the gate current of the silicon controlled rectifier 52 below its required firing value thereby rendering the rectifier 52 nonconductive during the remainder of the drying cycle. When the silicon controlled rectifier 52 is rendered nonconductive, the electronic ignitor system will no longer provide an arc between the discharge electrodes 40 and 41. The energizing current through the solenoid valve 30 after initial energization will be a reduced current flowing through the bypass circuit consisting of the resistor 65.

The resistor 65 is a safety device and is selected to provide the necessary reduced current flow through the solenoid valve 30 thereby maintaining it energized. However, the reduced current flow afforded by the resistor 65 is not sufficient to allow the solenoid valve 30 to become initially energized at the beginning of the drying cycle. Should the source of alternating voltage applied to the lines 13 and 14 be inadvertently interrupted during the normal drying operation of a clothes dryer, the solenoid valve 30 and the solenoid valve 31 will become deenergized, thereby stopping the flow of fuel to the fuel burner 11.

However, if the source of alternating current is restored to the lines 13 and 14, while the thermistor 60 is hot, no fuel will flow into the fuel burner 11. Although the solenoid valve 31 will become energized upon the restoration of alternating power, the solenoid valve 30 will not become energized because of the current limiting resistor 65.

The solenoid valve 30 will continue to remain deenergized until the thermal responsive variable resistor 60 has cooled sufficiently to increase the resistance value thereof and apply the necessary voltage to terminal point 59 to render the silicon controlled rectifier 52 conductive during respective portions of positive half cycle of alternating voltage.

Figure 7:
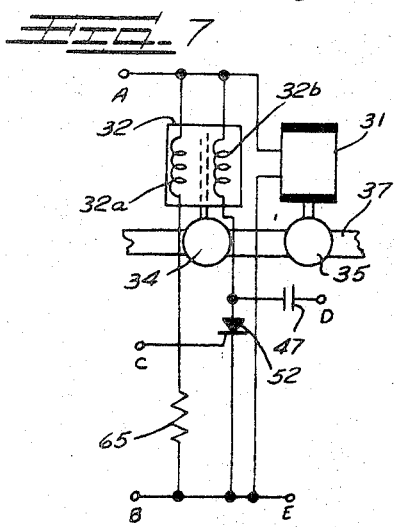
FIGURE 7 is a partial schematic wiring diagram showing an alternate solenoid valve arrangement.
Figure 6:
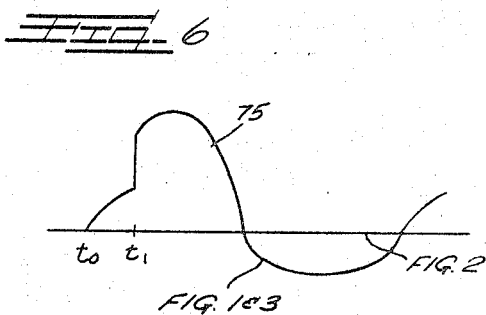
FIGURE 6 is a graphical representation of a voltage waveform which appears across the coil 30 of the solenoid shown in FIGURES 1, 2 and 3.

It should be appreciated that the solenoid valve 30 could be of a two coil construction wherein the two coils jointly providing sufficient force to open the valve while one of the coils only produces enough force to hold the valve open. This type of construction is illustrated in FIGURE 7. FIGURE 7 shows a partial circuit employing the two coil gas valve construction. The partial circuit of FIGURE 7 can be connected into the circuit of FIGURE 1 at corresponding points in the circuit designated as A, B, C, D and E to provide a complete circuit. The valve solenoid 32 is comprised of two individually wound coils 32a and 32b. Upon the closure of the switch 16, holding coil 32a is energized through resistor 65 and pull-in coil 32b is energized through the silicon controlled rectifier 52 the operation of which has been described previously. Solenoid valve 31 is energized as was explained in the description of the operation of the circuit of FIGURE 1. Upon the ignition of the fuel, the silicon controlled rectifier is rendered nonconductive as previously explained and the current flow through solenoid coil 32b is terminated. The valve is maintained in the open position by solenoid holding coil 32a.

Still another safety feature provided by the control system 10 is the utilization of a thermal heater 56 which cooperates with the bi-metal switch 26 in such a manner as to open the switch 26 should the fuel in the fuel burner 11 not ignite after a predetermined period of time. As power is applied to the line 21 after the switch 16 is closed, current will flow through the resistor 55, the electric heating device 56 and the adjustable resistor 57. The electric heating device 56 will continue to become progressively warmer until such a time that the bi-metal switch 26 is open thereby removing the energizing power to the solenoid valves 30 and 31. Since the fuel from the fuel burner 11 has not ignited, current will continue to flow through the current heating device 56 until the switch 26 is opened.

One of the advantages of this invention is that the safety device of the heater 56 and bi-metal switch 26 is controlled by the same current which passes through the triggering circuit of the electronic switching device 52. By so connecting the heater 56 in series with the voltage divider network, the control system 10 will not operate unless the safety heater 56 is capable of detecting the failure of fuel ignition. To illustrate, if the heater 56 should burn in two the voltage divider network is interrupted thereby removing the necessary triggering current from the electronic switching device 52 which, in turn, will not energize the solenoid valve 30 to allow fuel to flow.

Shown in FIGURE 2 is an alternate embodiment of the ignitor control system shown in FIGURE 1 and is designated generally with reference numeral 10a. A thermal responsive device 80 is located in proximity with the fuel burner 11. By way of example the thermal responsive variable resistor 80 is a thermistor having a positive resistance temperature coefficient. The thermistor 80 is connected in series with the voltage divider network comprising the resistor 55, the electric heater 56 and the adjustable resistor 57. By so providing the thermistor 80 in series with the voltage divider circuit, it is possible to use a device having a positive thermal coefficient as mentioned hereinabove. Moreover, should the thermistor 80 fail in the open or high resistance condition, the silicon controlled rectifier 52 will not become conductive.

In operation, the thermistor 80 has a cold resistance value sufficiently low to allow firing gate current to flow through the gate of silicon controlled rectifier 52, the electric heating device 56, the thermister 80 and the resistor 55, thereby providing the necessary switching action to energize the electronic ignitor circuit and the solenoid valve 30a. Upon ignition of the fuel from the fuel burner 11, the thermister 80 will increase its resistance thereby decreasing the gate current through the silicon controlled rectifier 52. This action will render the silicon controlled rectifier 52 nonconductive, as mentioned hereinabove, and the solenoid valve 30a will remain energized through a bypass diode 81 and the bypass resistor 65.

By way of example, the solenoid valve 30a is preferably designed to operate only from a source of pulsating D.C. current and will not operate from a source of alternating current. By so providing such a solenoid valve a safety feature which detects both an open or short circuit of the silicon controlled rectifier 52 is provided.

Should the silicon controlled rectifier 52 become electrically open it is obvious that the solenoid valve 30a will have no pulsating current therethrough and will not operate. However, should the silicon controlled rectifier 52 become electrically short-circuited a source of alternating current will then be applied to the solenoid valve 30a and it will not operate. The bypass diode 81 is provided in series with the resistor 65 and the solenoid valve 30a to block the negative half cycle of the reduced energizing voltage applied to the solenoid valve 30.

Shown in FIGURE 3 is an embodiment of the present invention generally designated with reference numeral 10b. The silicon controlled rectifier 52 is rendered conductive by an electronic triggering circuit 85 which is disposed between the electric heater 56 and the resistor 57. A silicone controlled rectifier 86 is rendered conductive by a triggering diode 88, which, in turn, discharges a triggering capacitor 89 through the gate-to-cathode circuit of the silicon controlled rectifier 86. A current limiting resistor 90 is connected in series with the triggering diode 88 and the gate electrode of the silicon controlled rectifier 86 to prevent excessive firing current from flowing between the gate and cathode junction thereof. A charging resistor 92 is connected in series with the heating device 56 and the capacitor 89 thereby controlling the rate of charge on the capacitor 89.

When an alternating voltage is applied between lines 21 and 14 the capacitor 88 will charge through resistor 92 and electric heating device 56 until the voltage across the capacitor 89 is sufficient to render the triggering diode 88 conductive. This action will cause the capacitor 89 to discharge through the line 14, the resistor 57, the gate-to-cathode junction of the silicon controlled rectifier 86, the triggering diode 88, and the resistor 90, thereby rendering the silicon controlled rectifier 86 conductive.

An increased current will flow through the adjustable resistor 57 and the electric heating device 56, and the gate electrode of the silicon controlled rectifier 52 will receive the positive potential from the line point 59 thereby firing the silicon controlled rectifier 52. This action will energize the solenoid valve 30 and discharge the capacitor 47 through the primary winding 44 to provide an arc between the discharge electrodes 40 and 41, as mentioned hereinabove. After the fuel from the fuel burner 11 has been ignited the thermistor 60 is heated thereby reducing its resistance value and shunting the triggering diode 88 which, in turn, will render the silicon controlled rectifier 86 nonconductive during all subsequent positive half cycles applied thereto.

Another safety feature of the present invention is that if the thermistor 60 fails open, thereby not being able to detect the absence of a flame from the fuel burner 11, current will continue to flow through the electric heating device 56 and eventually open the safety switch 26. Also, should the thermistor 60 fail shorted, the terminal point 62 will be at a reduced voltage and in like manner terminal point 59 will also be at a reduced voltage thereby not allowing the silicon controlled rectifier 52 to become conductive to energize the solenoid valve 30.

Similarly, should the thermistor 80, shown in FIGURE 2, fail in the short circuit condition allowing current to pass through the electric heater 56, the safety bi-metal switch 26 will open deenergizing the solenoid valves 30 and 31. And should the thermistor 80 fail in the open circuit condition, the silicon controlled rectifier 52 will have no gate current applied thereto and will not operate.

In one exemplary embodiment of the present invention, component values are as follows:

FIGURE 1

| | |
|---|---|
| Solenoid valve 30 | Resistance=300 ohms. Inductance=.7 henry. |
| Solenoid valve 31 | Resistance=300 ohms. Inductance=.7 henry. |
| Transformer 43 | Turns ratio=100 to 1. |
| Resistor 55 | 1800 ohms, 20 watt. |
| Resistor 57 | 200 ohms. |
| Resistor 65 | 900 ohms, 5 watt. |
| Heater 56 | 1800 ohms. |
| Silicon controlled rectifier 52. | 1 amp, 400 volts. |
| Capacitor 47 | 1 mfd., 400 WVDC. |
| Thermistor 60 | Resistance at 1700° F.=100 ohms, Resistance at 70° F.=$5 \times 10^6$ ohms. |

FIGURE 2

| | |
|---|---|
| Solenoid valve 30a | D.C. valve. |
| Thermistor 80 | Resistance at 70° F.=300 ohms, Resistance at 1700° F.=50,000 ohms. |
| Diode 81 | 1 amp, 400 volts. |

FIGURE 3

| | |
|---|---|
| Resistor 90 | 1000 ohms, ½ watt. |
| Resistor 92 | 47,000 ohms, ½ watt. |
| Capacitor 89 | .1 mfd., 50 WVDC. |
| Trigger diode 88 | TI 42. |
| Silicon controlled rectifier 86 | 1 amp, 400 volts. |

Although minor modifications might be suggested by those versed in the art, it should be understood that we wish to embody within the scope of the patent warranted hereon all such modifications as reasonably and properly come within the scope of our contribution to the art.

The embodiments of the invention in which an exclusive property or privilege is claimed are defined as follows:

1. A control system for operation for a fuel burner comprising:
   fuel conduit means for introducing fuel into said fuel burner, a first electrically controlled valve means operable from a source of pulsating direct voltage,
   a second electrically controlled valve means operable from a source of alternating voltage,
   conduit means connecting said first and second electrically controlled valve means and said fuel conduit means for control thereof,
   an electrically energized ignitor circuit means operable from a source of pulsating direct current and electrically connected with said first electrically controlled valve means,
   a source of alternating voltage,
   circuit means connecting first and second electrically controlled valve means and said ignitor circuit means to said source of alternating voltage and including an electronic switch provided with a gating means in circuit with said first valve means and said ignitor circuit means and rendered conductive for opening said first valve means and energizing said electronic switch gating means to render said electronic switch conductive at a predetermined voltage of said alternating voltage.
   and a bypass circuit comprising a diode and a resistor,
   said bypass circuit connected in parallel with said electronic switch and in series with said first valve means to maintain said first valve means open when said electronic switch is nonconductive.

2. A control system for operation of a fuel burner in a clothes dryer comprising:
   electrically controlled valve means for controlling the supply of fuel to the fuel burner,
   an electrically energized ignitor circuit consisting of a step-up transformer having primary and secondary windings,
   a charging capacitor in circuit with said primary windings,
   a discharge electrode in the circuit with said secondary windings and adapted to be placed in proximity to said fuel burner,
   a silicon controlled rectifier connected in series with said valve means and in parallel with said ignitor system relative to the electrical source,
   a gating means connected to said silicon controlled rectifier for controlling the conduction thereof,
   said gating means comprising an electric heater resistance, and
   a flame responsive device to be located in proximity to said fuel burner whereby a flame responsive responsive device renders the silicon controlled rectifier nonconductive when a flame is sensed at said burner.

3. The control system of claim 2 in which the flame responsive device is a negative thermal coefficient thermistor.

4. The system of claim 2 in which the flame responsive device is a positive coefficient thermistor.

5. A control system for operating a fuel burned comprising:
   conduit means for supplying fuel to said fuel burner,
   valve means controlling fuel flow through said conduit means,
   an electrically controlled operator controlling said valve means,
   ignition means for igniting fuel emanating from said fuel burner,
   circuit means connecting said electrically controlled operator and said ignition means to a source of voltage,
   a solid state switching device connected in said circuit means and controlling simultaneously the current flow through both said electrically controlled operator and said ignition means,
   and triggering means in said circuit means for applying a triggering voltage to said solid state switching device to energize both said ignition means and said electrically controlled operator, said triggering means including a flame responsive device to be located in proximity with said fuel burner whereby said flame responsive device causes said solid state switching device to be nonconductive when a flame is sensed at said burner.

6. A control system for operating a fuel burner comprising:
   conduit means for supplying fuel to said fuel burner, valve means controlling fuel flow through said conduit means, an electrically controlled operator controlling said valve means, ignition means for igniting fuel emanating from said fuel burner, first circuit means connecting said electrically controlled operator and said ignition means to a source of voltage, a solid state switching device connected in said first circuit means and controlling the operation of both said electrically controlled operator and said ignition means, second circuit means including triggering means for applying a triggering voltage to said solid state switching device to make said switching device conductive to energize both said electrically controlled operator and said ignition means, and a flame responsive device to be located in proximity to said fuel burner whereby the flame responsive device renders the solid state switching device nonconductive when a flame is sensed at said burner by said flame responsive device.

7. The system of claim 6 in which said flame responsive device is in series with said triggering means.

8. The system of claim 6 in which said flame responsive device is in parallel with said triggering means.

9. A control system for operation of a fuel burner in a clothes dryer comprising:

electrically controlled valve means for controlling the supply of fuel to the burner;

an electrically energized ignitor circuit consisting of a step-up transformer having primary and secondary windings, a charging capacitor in circuit with said primary winding, a discharge electrode in circuit with said secondary winding and adapted to be placed in proximity to said fuel burner;

a silicon controlled rectifier connected to provide a current path for said valve means and said ignitor circuit when said silicon controlled rectifier is rendered conductive;

gating means connected to said silicon controlled rectifier for controlling the conduction thereof, said gating means including an electric heater, resistance, and a flame responsive device to be located in proximity to said fuel burner whereby the flame responsive device renders said silicon controlled rectifier nonconductive when a flame is sensed at said burner.

10. An ignition and control system in a fluid burning apparatus comprising, in combination, a power source, a solenoid operated valve to control the flow to said apparatus and connected to said power source, means to control the flow of energizing current in said solenoid including a silicon controlled rectifier having a control electrode, a spark coil and an energy storage capacitor connected in series with said controlled rectifier whereby conduction of said controlled rectifier causes a discharge of energy into said spark coil from said capacitor, a thermistor and an electric heater of a temperature responsive bimetallic element in series with each other and connected to the control electrode of said controlled rectifier acting to stop conduction of said controlled rectifier when said thermistor is heated by a flame from said apparatus and a normally closed safety switch actuated by said bi-metallic element to open the circuit to said solenoid operated valve upon failure of said thermistor to perform its control function.

11. An electrically operated burner system comprising a burner, a fuel line connected thereto, a solenoid valve in said fuel line, a spark igniter associated with said burner, a transformer having a primary and secondary with the secondary thereof connected to said spark igniter, an electrical power supply having two lines, a variable conduction device having input and output main terminals as part of a single main conduction path and a control terminal, a condenser, a circuit connecting said condenser, said primary and said input and output main terminals in series and with said output terminal connected to one line of said power supply, a charging circuit connecting said condenser to said power supply, a circuit extending from the other line of said power supply through the solenoid winding and a current limiting resistor to said one line of said power supply, a connection extending from the latter circuit from a point between said solenoid winding and said resistor to said input terminal including a flame sensitive variable resistance and located to monitor flame from said burner and adapted to control the condition of said device to turn on said device in the absence of flame, and to turn off said device in the presence of flame.

12. An ignition and control system in a fluid burning apparatus comprising, in combination, a power source, a solenoid operated valve to control the flow of fluid to said apparatus and connected to said power source, means to control the flow of energizing current in said solenoid including a silicon controlled rectifier having a control electrode, a spark coil and an energy storage capacitor connected in series with said controlled rectifier whereby conduction of said controlled rectifier causes a discharge of energy into said spark coil from said capacitor, a thermistor and an electric heater of a current responsive element in series with each other and connected to the control electrode of said controlled rectifier acting to stop conduction of said controlled rectifier when said thermistor is heated by a flame from said apparatus and a normally closed safety switch actuated by said current responsive element to open the circuit to said solenoid operated valve upon failure of said thermistor to perform its control function.

13. An electric ignition and control system in a fuel burning apparatus for controlling the flow of fuel to the burning apparatus and for providing electric ignition for the fuel at the burner, comprising, in combination, a controlled conduction device having an anode, a cathode and a control electrode, said controlled conduction device operatively connected to a power source and to a control means for controlling the flow of fuel and an ignition means whereby the energization of said control means and said ignition means are interdependent upon and controlled by the condition of the controlled device, a control circuit connected to the control electrode of the controlled device and effective to fire circuit having a resistive element responsive to the heating effect of ignited fuel to vary its resistance and a current responsive element effective to open a normally-closed switch in the power circuit to the controlled device whereby the firing of the controlled device by the control circuit is responsive to the changes in the resistance of the control circuit, and whereby after a predetermined power input into the current responsive element, the normally-closed switch in the power circuit to the controlled device is opened.

References Cited

UNITED STATES PATENTS

| 2,869,633 | 1/1959 | Schaaf et al. | 158—128 |
| 3,030,548 | 4/1962 | Johnston | 315—177 |
| 3,136,877 | 6/1964 | Heller | 219—499 |
| 3,144,898 | 8/1964 | Queever | 158—125 |
| 3,204,685 | 9/1965 | Patrick | 158—125 |
| 3,238,992 | 3/1966 | Forbes | 158—128 X |
| 3,247,887 | 4/1966 | Matthews | 158—125 |

EDWARD G. FAVORS, Primary Examiner

U.S. Cl. X.R.

317—79; 431—69, 72

UNITED STATES PATENT OFFICE
CERTIFICATE OF CORRECTION

Patent No. 3,488,131          Dated January 6, 1970

Inventor(s) George H. Meyers and Franklin C. Harter

It is certified that error appears in the above-identified patent and that said Letters Patent are hereby corrected as shown below:

Column 8, line 4 after "connecting" insert --said--; line 34 cancel "a"; line 39 change "a" to read --the--; line 48, change "burned" to read --burner--.

Column 9, line 11, cancel "the operation of" and insert --simultaneously the current flow through--; line 51, after "flow" insert --of fluid--.

Column 10, line 12 after "nal" insert --circuit means connected to said control terminal--; line 48, after "fire" insert --the controlled device at predetermined times, said control--.

SIGNED AND
SEALED
JUL 7 1970

(SEAL)
Attest:

Edward M. Fletcher, Jr.
Attesting Officer

WILLIAM E. SCHUYLER, JR.
Commissioner of Patents

FORM PO-1050 (10-69)